Oct. 17, 1967     W. R. SCHOLLE     3,347,012
STERILE PACKAGING
Filed Oct. 11, 1965
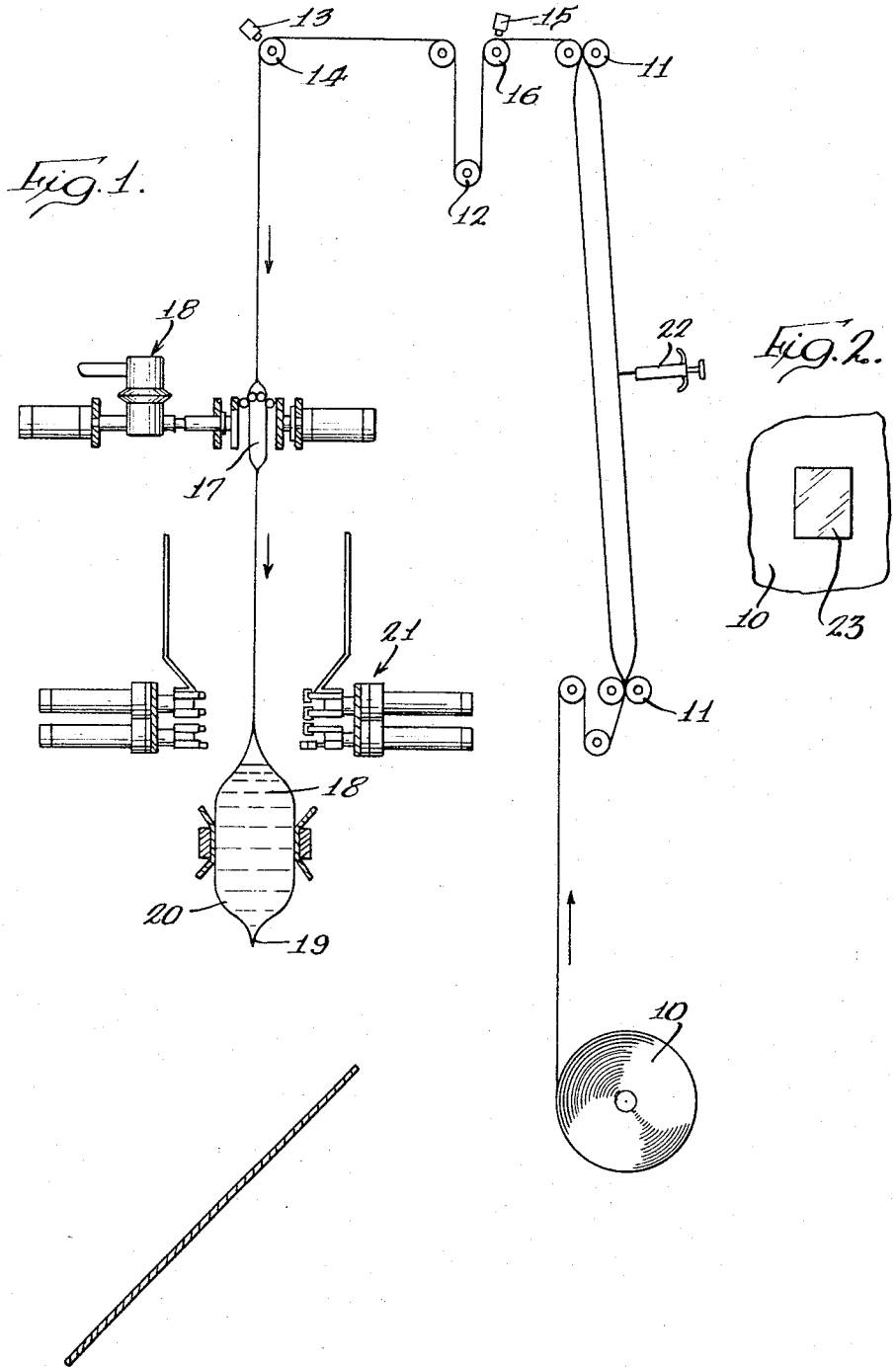

3,347,012
STERILE PACKAGING
William R. Scholle, Long Beach, Calif., assignor to Scholle Container Corporation, Northlake, Ill., a corporation of Illinois
Filed Oct. 11, 1965, Ser. No. 494,760
4 Claims. (Cl. 53—29)

This invention relates to method for internally sterilizing tubular thermoplastic film material for the production of packaging.

More particularly the process of the present invention relates to the sterilizing of thermoplastic film material which comprises unrolling and moving forwardly said tubular material from a roll thereof in collapsed form by passing said tubular material between spaced pairs of rollers and injecting sterilizing gaseous material into said tube while passing between said roller pairs, and resealing said tube at the point of injection whereby to entrap said gaseous material and distend said tubular material during passage between said roller pairs.

The process of the present invention is particularly adapted for forming endwise sealed packages from thermoplastic film material wherein a roll of said tubular material in collapsed form is unrolled and moved forwardly and intermittently formed with transverse seals and filled with fluent material between said seals prior to said filling and sealing.

It has heretofore been known to sterilize sealed packages composed of thermoplastic material such as polyethylene by subjecting the completed package to an atmosphere of a sterilizing gas such as ethylene oxide, the polyethylene being permeable to said sterilizing gas.

It is, however, an object of the present invention to introduce the sterilizing gases to the confines of the package before filling in a continuous process.

The objects of the present invention, the details thereof and the arrangement of apparatus for carrying out the process, and the economies thereof will be apparent from a consideration of the following specification and accompanying drawings, wherein:

FIG. 1 diagrammatically illustrates a side elevational view of an arrangement of apparatus for carrying out the present invention.

FIG. 2 is a fragmentary detail view of a means for sealing the thermoplastic material after sterilizing gas has been introduced into a tube thereof.

The illustrated process which comprises continuously forming and filling flexible containers, comprises drawing a length of tubular thermoplastic film material such as polyethylene from a collapsed roll supply thereof 10, the film being drawn forwardly between the spaced pairs of nip rolls 11, 11 and lengths drawn from the roll 10 intermittently by means of the dancer roll 12 at a time when the movement of the film is interrupted by the brake 13 acting on the roll 14. When the roll 12 intermittently moves downwardly to move a length of the film forwardly, the brake 15 acts on the roll 16 at which time the brake 13 is released and permits a length of the tubular film material to move forwardly over the mandrel 17. The mandrel 17 and the filling apparatus is more particularly described in my co-pending application, Ser. No. 337,598, filed Jan. 14, 1964.

This mandrel which is disposed within the confines of the tubular material is formed with an internal passage extending from one side thereof and opening in a downward direction so that the film material can be filled through the means generally indicated as 18 which comprises a filling probe which penetrates the film material, either by puncturing it or through an opening previously formed therein, and introduces for example liquid material such as water, fruit juice, milk, etc. 18 into the section of the tube which has been previously transversely sealed at 19 at its lower end. After filling the section generally designated as 20, the thermoplastic film material is formed with a pair of transverse spaced seals and severed between the seals, by the means generally indicated as 21, to form a completed package.

Although I have indicated in the drawing a means for forming and filling individual packages such as in my aforesaid co-pending application, it will be understood that the present invention is not limited thereto.

The characterizing feature of the present invention, however, comprises the introduction of sterilizing gases such as ethylene oxide alone or with sterile Freon as a flammability reducing diluent, or such other sterilizing gases such as sterile nitrogen, sodium hypochlorate vapor and other known sterilizing gases or mixtures thereof. This is accomplished by introducing a small amount of gas by means of such means as the needle 22, and the aperture sealed by heat sealing or by means of an adhesive patch 23. The sterilizing gas distends the tubular material during passage between the roller pairs 11, 11 and generally one injection of a gas bubble is sufficient for a single roll which is adequate to make one thousand bags. However, should the gas escape it may be reintroduced in the manner indicated to maintain the tubular material 10 distended between the roller pairs 11, 11 which has been found to be adequate to provide a sterile condition within the tube and completed bag 20.

Although I have shown and described the preferred embodiment of my invention, it will be understood by those skilled in the art that changes may be made in the details thereof without departing from its scope as comprehended by the following claims.

I claim:
1. A process for internally sterilizing tubular thermoplastic film material which comprises unrolling and moving forwardly said tubular material from a roll thereof in collapsed form, injecting sterilizing gaseous material into said tube at a point spaced from said roll and re-collapsing said tubular material at a point spaced from the point of injection, whereby to entrap said gaseous material and to distend said tubular material during passage between said roll and point of second collapse.

2. A process for internally sterilizing tubular thermoplastic film material which comprises passing said tubular material between spaced pairs of rollers, injecting sterilizing gaseous material into said tube while passing between said roller pairs and resealing said tube at the point of injection whereby to entrap said gaseous material and to distend said tubular material during passage between said roller pairs.

3. A process for sterilizing tubular thermoplastic film material which comprises unrolling and moving forwardly said tubular material from a roll thereof in collapsed form, passing said tubular material between spaced pairs of rollers, injecting sterilizing gaseous material into said tube while passing between said roller pairs and resealing said tube at the point of injection whereby to entrap said gaseous material and to distend said tubular material during passage between said roller pairs.

4. In a process for forming endwise sealed packages from tubular thermoplastic film material and wherein a roll of said tubular material in collapsed form is unrolled and moved forwardly and intermittently formed with transverse seals and filled with fluent material between said seals, the step which comprises passing said tubular material between spaced pairs of rollers and injecting sterilizing gaseous material into said tube while passing between said roller pairs and resealing said tube at the point of injection whereby to entrap said gaseous material and to distend said tubular material during passage between said roller pairs and prior to said filling and sealing.

References Cited

UNITED STATES PATENTS

| | | | |
|---|---|---|---|
| 2,761,264 | 9/1956 | Gossett | 53—180 |
| 2,918,770 | 12/1959 | Stocker | 53—180 |
| 2,928,219 | 3/1960 | Gubler | 53—180 |
| 3,063,211 | 11/1962 | Graves | 53—180 |
| 3,086,336 | 4/1963 | Rausing et al. | 53—180 |
| 3,163,971 | 1/1965 | Loliger et al. | 53—180 XR |

GRANVILLE Y. CUSTER, Jr., *Primary Examiner.*